Dec. 31, 1929.                S. ADAMY                1,742,119
                          MILK COOLING DEVICE
                         Filed Jan. 23, 1928        3 Sheets-Sheet 2

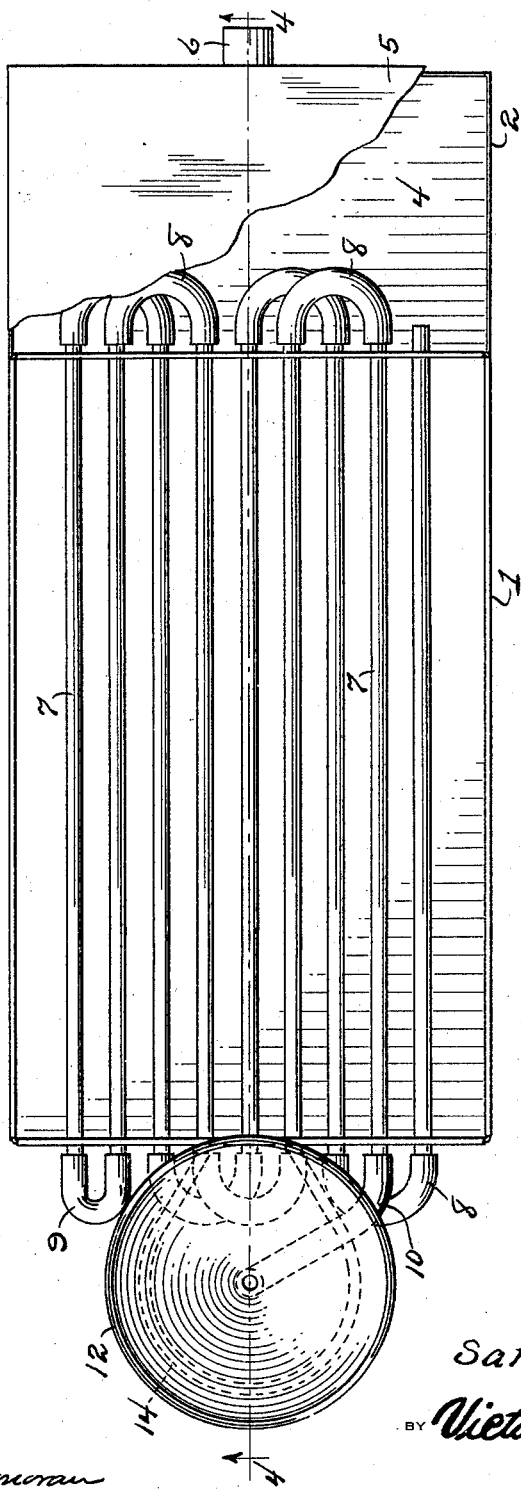

Sam Adamy
INVENTOR
BY Victor J. Evans
ATTORNEY

WITNESS:

Dec. 31, 1929.  S. ADAMY  1,742,119
MILK COOLING DEVICE
Filed Jan. 23, 1928  3 Sheets-Sheet 3

Sam Adamy, INVENTOR
BY Victor J. Evans
ATTORNEY

WITNESS

Patented Dec. 31, 1929

1,742,119

UNITED STATES PATENT OFFICE

SAM ADAMY, OF WELLSBORO, PENNSYLVANIA, ASSIGNOR OF ONE-HALF TO OTIS H. EVANS, OF WELLSBORO, PENNSYLVANIA

MILK-COOLING DEVICE

Application filed January 23, 1928. Serial No. 248,904.

My present invention has reference to a milk cooling device and my primary object is the provision of a device or apparatus of a simple and inexpensive construction wherein warm milk poured into a container is caused to circulate through a series of tubes that are arranged in a casing that contains cracked ice or cold water, so that the milk, after passing through the tubes will be cooled to the required temperature for shipping purposes.

A further object is the provision of a milk cooling device that shall be of a small and compact nature so that the same can be easily handled, the warm milk passing therethrough effectively cooled to a desired temperature in an easy and expeditious manner and wherein the parts constituting the improvement may be easily and effectively cleaned.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claim.

In the drawings:

Figure 1 is a top plan view of the improvement, the lid or cover for the milk receiving chamber being broken away.

Figure 3:
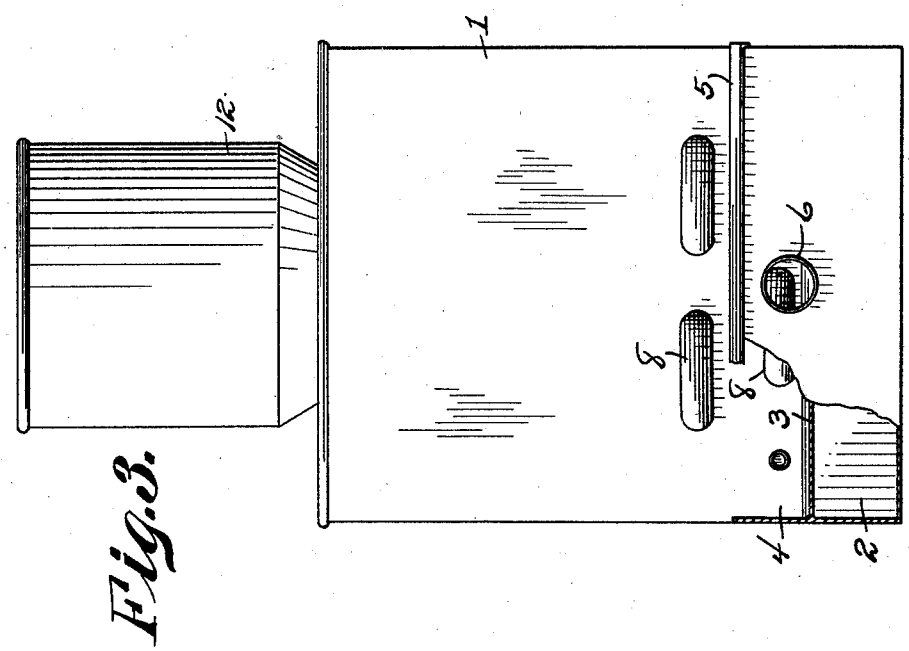
Figures 2 and 3 are views looking toward the respective ends of the improvement.
Figure 2:
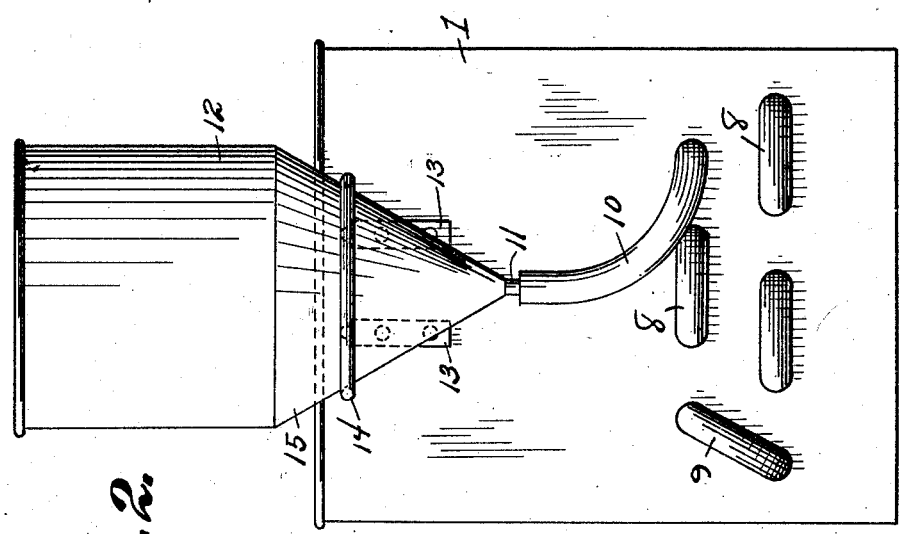
Figure 4:
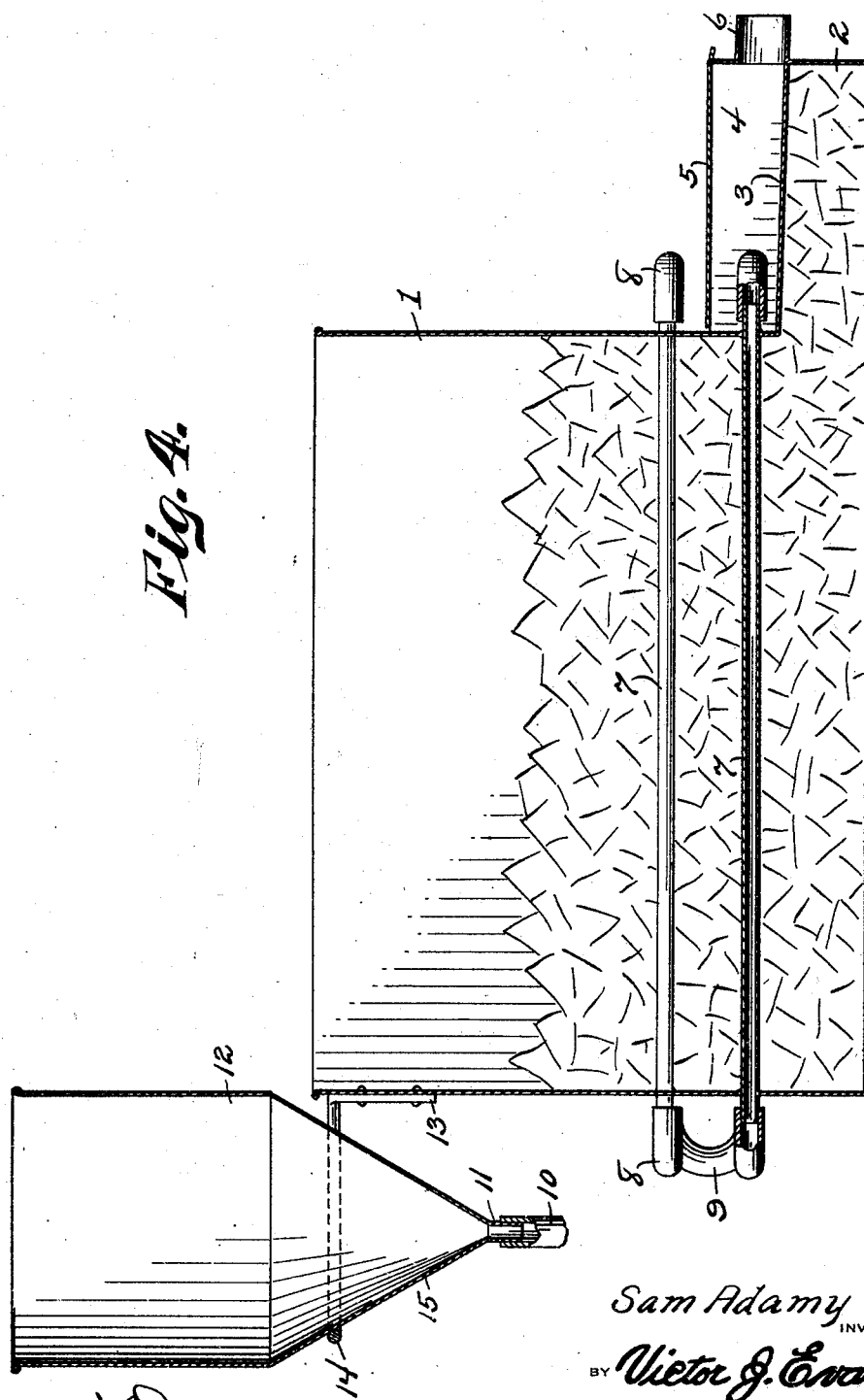
Figure 4 is an approximately central longitudinal sectional view through the improvement.

As disclosed by the drawings I make use of a substantially rectangular casing 1, preferably of metal. This casing, at its forward end and in a line with its bottom, is formed with an extension 2, whose upper wall 3 is arranged at a slight inclination, and the said wall 3 provides the bottom wall of the milk receiving chamber 4. A lid or cover plate 5 normally closes the chamber 4 and the outer wall of the chamber is provided with an outlet pipe 6.

The casing 1 has passing longitudinally therethrough upper and lower series of tubes 7. These tubes project through the ends of the casing, the lower series of tubes 7 having one of their ends received in the chamber 4. Preferably the tubes are of copper and are, of course, soldered or otherwise effectively secured to the ends of the casing 1 to afford a fluid tight joint therebetween. The lower series are uneven in number so that one of these tubes will deliver to the chamber 4. Of course, any desired number of series of tubes may be employed, and likewise more than two series such as is disclosed by the drawings may be also employed. The lower series of tubes except that to which I have referred to as the outlet tube are connected together by U-couplings 8. Preferably these couplings 8 are in the nature of short lengths of flexible pipes, and are received over and frictionally engage the ends of the tubes 7. By this arrangement it will be seen that the couplings 8 may be easily and quickly removed for the cleaning thereof and likewise that a cloth covered rod or the like may be passed through the tubes 7 to clean these tubes. One of the end tubes of the upper series is connected to one of the lower tubes by a coupling 9 similar to the couplings 8, and the second end tube of the upper series has attached thereto a flexible coupling 10 which is also preferably of rubber. The tube 10 is designed for frictional engagement with the spout end 11 of a milk receiving receptacle 12. The end of the casing provided with the couplings 9 and 10 has riveted or otherwise fixed adjacent to the top thereof brackets 13 to which is connected a ring member 14 that receives the lower and conical portion of the receptacle 12.

The container, as well as its extension 2, has arranged therein cracked ice which, of course, surrounds the tubes 7. Milk fresh from the cows is poured into the receptacle 12 and is delivered therefrom into the series of tubes. The milk in its passage through the tubes will be reduced to a temperature of say 60° which is the requirement of milk stations for shipping purposes. The milk will be further treated as this chamber is arranged directly over the extension 2 of the chamber 1 and is cooled by the ice and cold water in the receptacle provided by such extension.

The simplicity and advantages of my improvement will, it is thought, be readily apparent to those skilled in the art so that further detailed description is not thought necessary.

Having described the invention, I claim:

A milk cooling device comprising a receptacle for the reception of cracked ice or cold water, said receptacle having one of its ends having a lower extension, and a milk receiving chamber disposed over said extension, a removable closure for said chamber and said chamber having an outlet spout, upper and lower series of tubes extending longitudinally through the ends of the casing, and the lower series of tubes being extended into the milk receiving chamber, one of said last mentioned tubes providing a milk outlet, flexible couplings frictionally engaging the ends of the tubes, for establishing a milk circulation through all of the tubes, a milk receiving receptacle and a flexible coupling between the outlet of the receptacle and one of the upper series of the tubes.

In testimony whereof I affix my signature.

SAM ADAMY.